United States Patent
Chapman et al.

(10) Patent No.: US 8,751,385 B1
(45) Date of Patent: Jun. 10, 2014

(54) FINANCIAL EMAIL

(75) Inventors: Michael A. Chapman, Chicago, IL (US); Hyun Jin Ko, Evanston, IL (US); Rodney H. Monson, Waukegan, IL (US); Mark A. Jones, Evanston, IL (US); Bryan L. Mackrell, Pittsburgh, PA (US); Thomas S. Kunz, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 806 days.

(21) Appl. No.: 12/120,995

(22) Filed: May 15, 2008

(51) Int. Cl.
*G06Q 40/00* (2006.01)

(52) U.S. Cl.
USPC .................. 705/40; 705/35; 705/43; 705/1.1; 705/67

(58) Field of Classification Search
USPC ........ 705/1, 40, 35, 43, 42, 67; 235/379, 381; 345/168; 715/718, 268
See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,648,037 A | 3/1987 | Valentino |
| 4,837,422 A | 6/1989 | Dethloff et al. |
| 5,101,200 A | 3/1992 | Swett |
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,918,217 A | 6/1999 | Maggioncalda et al. |
| 5,953,710 A | 9/1999 | Fleming |
| 5,963,925 A | 10/1999 | Kolling et al. |
| 5,991,749 A | 11/1999 | Morrill, Jr. |
| 6,012,044 A | 1/2000 | Maggioncalda et al. |
| 6,032,134 A | 2/2000 | Weissman |
| 6,044,360 A | 3/2000 | Picciallo et al. |
| 6,049,776 A | 4/2000 | Donnelly et al. |
| 6,052,675 A | 4/2000 | Checchio |
| 6,064,984 A | 5/2000 | Ferguson et al. |
| 6,064,986 A | 5/2000 | Edelman |
| 6,085,174 A | 7/2000 | Edelman |
| 6,088,682 A | 7/2000 | Burke |
| 6,112,191 A | 8/2000 | Burke |
| 6,128,603 A | 10/2000 | Dent et al. |
| 6,173,269 B1 | 1/2001 | Solokl et al. |
| 6,332,154 B2 | 12/2001 | Beck et al. |

(Continued)

FOREIGN PATENT DOCUMENTS

WO    WO 96/34358 A1    10/1996
WO    WO 03/030054 A1   4/2003

OTHER PUBLICATIONS

U.S. Appl. No. 12/152,073, filed May 12, 2008.
U.S. Appl. No. 12/152,028, filed May 12, 2008.

(Continued)

*Primary Examiner* — John H Holly
(74) *Attorney, Agent, or Firm* — Buchanan Ingersoll & Rooney PC; Robert J. Pugh (57) ABSTRACT

A user interface hosted by a financial institution. The user interface is accessible via a communication network by a first user using a client device and includes at least one first screen for managing financial transactions of the first user. The user interface further includes a second screen for conducting email communication between the first user and at least one party other than the financial institution.

20 Claims, 3 Drawing Sheets

(56) References Cited

U.S. PATENT DOCUMENTS

| | | |
|---|---|---|
| 6,353,811 B1 | 3/2002 | Weissman |
| 6,401,079 B1 | 6/2002 | Kahn et al. |
| 6,411,938 B1 | 6/2002 | Gates et al. |
| 6,473,794 B1 | 10/2002 | Guheen et al. |
| 6,493,685 B1 | 12/2002 | Ensel et al. |
| 6,519,571 B1 | 2/2003 | Guheen et al. |
| 6,601,233 B1 | 7/2003 | Underwood |
| 6,609,110 B1 | 8/2003 | Dowd et al. |
| 6,633,878 B1 | 10/2003 | Underwood |
| 6,636,242 B2 | 10/2003 | Bowman-Amuah |
| 6,636,833 B1 | 10/2003 | Flitcroft et al. |
| 6,684,190 B1 | 1/2004 | Powers et al. |
| 6,718,314 B2 | 4/2004 | Chaum et al. |
| 6,718,535 B1 | 4/2004 | Underwood |
| 6,742,002 B2 | 5/2004 | Arrowood |
| 6,742,704 B2 | 6/2004 | Fitzmaurice et al. |
| 6,839,687 B1 * | 1/2005 | Dent et al. ............... 705/40 |
| 6,839,692 B2 | 1/2005 | Carrott et al. |
| 6,876,971 B1 | 4/2005 | Burke |
| 6,921,268 B2 | 7/2005 | Bruno et al. |
| 6,993,510 B2 | 1/2006 | Guy et al. |
| 7,024,390 B1 | 4/2006 | Mori et al. |
| 7,031,939 B1 | 4/2006 | Gallagher et al. |
| 7,039,440 B2 | 5/2006 | Rodriguez et al. |
| 7,062,458 B2 | 6/2006 | Maggioncalda et al. |
| 7,076,465 B1 | 7/2006 | Blagg et al. |
| 7,100,195 B1 | 8/2006 | Underwood |
| 7,110,979 B2 | 9/2006 | Tree |
| 7,143,064 B2 | 11/2006 | Picciallo et al. |
| 7,146,338 B2 | 12/2006 | Kight et al. |
| 7,147,149 B2 | 12/2006 | Giraldin et al. |
| 7,165,041 B1 | 1/2007 | Guheen et al. |
| 7,171,370 B2 | 1/2007 | Burke |
| 7,175,073 B2 | 2/2007 | Kelley et al. |
| 7,184,979 B1 | 2/2007 | Carson |
| 7,248,855 B2 | 7/2007 | Joyce et al. |
| 7,249,092 B2 | 7/2007 | Dunn et al. |
| 7,249,097 B2 | 7/2007 | Hutchison et al. |
| 7,263,507 B1 | 8/2007 | Brake, Jr. et al. |
| 7,264,153 B1 | 9/2007 | Burke |
| 7,319,986 B2 | 1/2008 | Praisner et al. |
| 7,328,839 B2 | 2/2008 | Keohane et al. |
| 7,346,528 B2 | 3/2008 | Thengvall et al. |
| 7,376,569 B2 | 5/2008 | Plunkett et al. |
| 7,379,887 B2 | 5/2008 | Pachon et al. |
| 7,382,773 B2 | 6/2008 | Schoeneberger et al. |
| 7,401,731 B1 | 7/2008 | Pietz et al. |
| 7,502,758 B2 | 3/2009 | Burke |
| 7,536,351 B2 | 5/2009 | Leblang et al. |
| 7,571,849 B2 | 8/2009 | Burke |
| 7,577,665 B2 | 8/2009 | Ramer et al. |
| 7,580,881 B2 | 8/2009 | Singer et al. |
| 7,620,573 B2 | 11/2009 | Jameson |
| 7,627,512 B2 | 12/2009 | Harris et al. |
| 7,647,322 B2 | 1/2010 | Thomsen |
| 7,660,581 B2 | 2/2010 | Ramer et al. |
| 7,668,768 B2 | 2/2010 | Oikonomidis |
| 7,672,861 B2 | 3/2010 | Al-Otaibi et al. |
| 7,685,083 B2 | 3/2010 | Fairweather |
| 7,707,052 B2 | 4/2010 | Kuhn et al. |
| 7,711,619 B2 | 5/2010 | Merton et al. |
| 7,716,217 B2 | 5/2010 | Marston et al. |
| 7,729,959 B1 | 6/2010 | Wells et al. |
| 7,752,123 B2 | 7/2010 | Brookfield et al. |
| 7,774,257 B2 | 8/2010 | Maggioncalda et al. |
| 7,783,564 B2 | 8/2010 | Mullen et al. |
| 7,788,146 B2 | 8/2010 | McCarthy, Jr. |
| 7,792,748 B1 | 9/2010 | Ebersole et al. |
| 7,797,181 B2 | 9/2010 | Vianello |
| 7,797,218 B2 | 9/2010 | Rosen et al. |
| 7,797,226 B2 | 9/2010 | Ram et al. |
| 7,818,233 B1 | 10/2010 | Sloan et al. |
| 7,831,494 B2 | 11/2010 | Sloan et al. |
| 7,835,972 B2 | 11/2010 | Almeida et al. |
| 7,844,492 B2 | 11/2010 | Perkowski et al. |
| 7,844,546 B2 | 11/2010 | Fleishman |
| 7,848,948 B2 | 12/2010 | Perkowski et al. |
| 7,860,871 B2 | 12/2010 | Ramer et al. |
| 7,865,187 B2 | 1/2011 | Ramer et al. |
| 7,870,066 B2 | 1/2011 | Lin |
| 7,912,790 B2 | 3/2011 | Albertsson |
| 7,937,292 B2 | 5/2011 | Baig et al. |
| 7,962,419 B2 | 6/2011 | Gupta et al. |
| 8,015,090 B1 | 9/2011 | Borzych et al. |
| 8,086,558 B2 | 12/2011 | Dewar |
| 8,099,350 B2 | 1/2012 | Ryder |
| 2001/0037315 A1 * | 11/2001 | Saliba et al. ............... 705/70 |
| 2001/0047310 A1 | 11/2001 | Russell |
| 2002/0002479 A1 | 1/2002 | Almog et al. |
| 2002/0007330 A1 | 1/2002 | Kumar et al. |
| 2002/0026412 A1 | 2/2002 | Kabin |
| 2002/0046074 A1 | 4/2002 | Barton |
| 2002/0052773 A1 | 5/2002 | Kraemer et al. |
| 2002/0055870 A1 | 5/2002 | Thomas |
| 2002/0077955 A1 | 6/2002 | Ramm |
| 2002/0095363 A1 | 7/2002 | Sloan et al. |
| 2002/0099635 A1 | 7/2002 | Guiragosian |
| 2002/0103805 A1 | 8/2002 | Canner et al. |
| 2002/0120568 A1 | 8/2002 | Leblang et al. |
| 2002/0123949 A1 | 9/2002 | VanLeeuwen |
| 2002/0133368 A1 | 9/2002 | Strutt et al. |
| 2002/0147672 A1 | 10/2002 | Gaini |
| 2002/0152158 A1 | 10/2002 | Paleiov et al. |
| 2002/0188536 A1 | 12/2002 | Molosavljevic et al. |
| 2003/0009411 A1 | 1/2003 | Ram et al. |
| 2003/0028483 A1 | 2/2003 | Sanders et al. |
| 2003/0033226 A1 | 2/2003 | Anderson |
| 2003/0050889 A1 | 3/2003 | Burke |
| 2003/0055758 A1 | 3/2003 | Sidhu et al. |
| 2003/0083930 A1 | 5/2003 | Burke |
| 2003/0135634 A1 | 7/2003 | Moeller et al. |
| 2003/0177027 A1 | 9/2003 | Dimarco |
| 2003/0216957 A1 | 11/2003 | Florence et al. |
| 2003/0221118 A1 | 11/2003 | Walker |
| 2004/0012588 A1 | 1/2004 | Lulis |
| 2004/0019543 A1 | 1/2004 | Blagg et al. |
| 2004/0044632 A1 | 3/2004 | Onn et al. |
| 2004/0054610 A1 | 3/2004 | Amstutz et al. |
| 2004/0068432 A1 | 4/2004 | Meyerkopf et al. |
| 2004/0088177 A1 | 5/2004 | Travis et al. |
| 2004/0107112 A1 | 6/2004 | Cotter |
| 2004/0117202 A1 | 6/2004 | Winklevoss et al. |
| 2004/0148234 A1 | 7/2004 | Gonen-Friedman et al. |
| 2004/0158513 A1 | 8/2004 | Musacchio |
| 2004/0186852 A1 | 9/2004 | Rosen |
| 2004/0192351 A1 | 9/2004 | Duncan |
| 2004/0215560 A1 | 10/2004 | Amalraj et al. |
| 2004/0254805 A1 | 12/2004 | Schwerin-Wenzel et al. |
| 2004/0267559 A1 | 12/2004 | Hinderer et al. |
| 2005/0026119 A1 | 2/2005 | Ellis et al. |
| 2005/0027632 A1 | 2/2005 | Zeitoun et al. |
| 2005/0060228 A1 | 3/2005 | Woo |
| 2005/0060318 A1 | 3/2005 | Brickman, Jr. |
| 2005/0080691 A1 | 4/2005 | Holm-Blagg |
| 2005/0086075 A1 | 4/2005 | Kaehler et al. |
| 2005/0154662 A1 | 7/2005 | Langenwalter |
| 2005/0164151 A1 | 7/2005 | Klein |
| 2005/0187804 A1 | 8/2005 | Clancy et al. |
| 2005/0240431 A1 | 10/2005 | Cotter |
| 2005/0282126 A1 | 12/2005 | Pesso |
| 2006/0064378 A1 | 3/2006 | Clementz et al. |
| 2006/0069635 A1 | 3/2006 | Ram et al. |
| 2006/0095331 A1 | 5/2006 | O'Malley et al. |
| 2006/0100919 A1 | 5/2006 | Levine |
| 2006/0122922 A1 | 6/2006 | Lowenthal |
| 2006/0122923 A1 | 6/2006 | Burke |
| 2006/0149609 A1 | 7/2006 | Stenerson et al. |
| 2006/0163341 A1 | 7/2006 | Tulluri et al. |
| 2006/0178971 A1 | 8/2006 | Owen et al. |
| 2006/0224478 A1 | 10/2006 | Harbison et al. |
| 2006/0235777 A1 | 10/2006 | Takata |
| 2006/0242084 A1 | 10/2006 | Moses |
| 2006/0277091 A1 | 12/2006 | Kochikar et al. |
| 2006/0277128 A1 | 12/2006 | Anandarao et al. |

(56) References Cited

U.S. PATENT DOCUMENTS

| | | |
|---|---|---|
| 2006/0282353 A1 | 12/2006 | Gikandi |
| 2006/0282369 A1 | 12/2006 | White |
| 2007/0005477 A1 | 1/2007 | McAtamney |
| 2007/0005496 A1 | 1/2007 | Cataline et al. |
| 2007/0005524 A1 | 1/2007 | Iwachin |
| 2007/0034688 A1 | 2/2007 | Burke |
| 2007/0038545 A1 | 2/2007 | Smith et al. |
| 2007/0038610 A1 | 2/2007 | Omoigui |
| 2007/0055549 A1 | 3/2007 | Moore et al. |
| 2007/0055602 A1 | 3/2007 | Mohn |
| 2007/0060109 A1 | 3/2007 | Ramer et al. |
| 2007/0060173 A1 | 3/2007 | Ramer et al. |
| 2007/0061252 A1 | 3/2007 | Burke |
| 2007/0061257 A1 | 3/2007 | Neofytides et al. |
| 2007/0061333 A1 | 3/2007 | Ramer et al. |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0112662 A1 | 5/2007 | Kumar |
| 2007/0156519 A1 | 7/2007 | Agassi et al. |
| 2007/0162301 A1 | 7/2007 | Sussman et al. |
| 2007/0162387 A1 | 7/2007 | Cataline et al. |
| 2007/0179841 A1 | 8/2007 | Agassi et al. |
| 2007/0185721 A1 | 8/2007 | Agassi et al. |
| 2007/0192318 A1 | 8/2007 | Ramer et al. |
| 2007/0208588 A1 | 9/2007 | Rhoades et al. |
| 2007/0208624 A1 | 9/2007 | Gallagher |
| 2007/0214162 A1 | 9/2007 | Rice |
| 2007/0231777 A1 | 10/2007 | Dimarco |
| 2007/0241120 A1 | 10/2007 | Henry |
| 2007/0255965 A1 | 11/2007 | McGucken |
| 2007/0298392 A1 | 12/2007 | Mitchell |
| 2008/0015970 A1 | 1/2008 | Brookfield et al. |
| 2008/0015988 A1 | 1/2008 | Brown et al. |
| 2008/0040845 A1 | 2/2008 | Shoshan |
| 2008/0060241 A1 | 3/2008 | Molinaro |
| 2008/0120129 A1 | 5/2008 | Seubert et al. |
| 2008/0133393 A1 | 6/2008 | Arnold et al. |
| 2008/0140559 A1 | 6/2008 | Ram et al. |
| 2008/0183545 A1 | 7/2008 | Deitrich et al. |
| 2008/0195512 A1 | 8/2008 | Klebanoff et al. |
| 2008/0195556 A1 | 8/2008 | Vioni |
| 2008/0201208 A1 | 8/2008 | Tie et al. |
| 2008/0208638 A1 | 8/2008 | Davidson et al. |
| 2008/0243716 A1 | 10/2008 | Ouimet et al. |
| 2008/0249936 A1 | 10/2008 | Miller et al. |
| 2008/0319781 A1 | 12/2008 | Stivoric et al. |
| 2009/0006418 A1 | 1/2009 | O'Malley |
| 2009/0063353 A1 | 3/2009 | Viidu et al. |
| 2009/0092241 A1 | 4/2009 | Minert et al. |
| 2009/0094170 A1 | 4/2009 | Mohn |
| 2009/0112674 A1 | 4/2009 | Musso et al. |
| 2009/0119013 A1 | 5/2009 | O'Malley |
| 2009/0132313 A1 | 5/2009 | Chandler et al. |
| 2009/0138341 A1 | 5/2009 | Mohan et al. |
| 2009/0177688 A1 | 7/2009 | Karlsen et al. |
| 2009/0182664 A1 | 7/2009 | Trombley |
| 2009/0192874 A1 | 7/2009 | Powles et al. |
| 2009/0204448 A1 | 8/2009 | Kaehler et al. |
| 2009/0204455 A1 | 8/2009 | Rubin |
| 2009/0204538 A1 | 8/2009 | Ley et al. |
| 2009/0216641 A1 | 8/2009 | Hubbard |
| 2009/0234697 A1 | 9/2009 | Taguchi |
| 2009/0254469 A1 | 10/2009 | Robertson |
| 2009/0276231 A1 | 11/2009 | Bazigos et al. |
| 2009/0276258 A1 | 11/2009 | Dane |
| 2009/0292648 A1 | 11/2009 | Damschroder et al. |
| 2009/0319289 A1 | 12/2009 | Pande |
| 2009/0319344 A1 | 12/2009 | Tepper et al. |
| 2009/0327051 A1 | 12/2009 | Nerby |
| 2009/0327106 A1 | 12/2009 | Bartelt et al. |
| 2010/0023385 A1 | 1/2010 | Galvan |
| 2010/0030671 A1 | 2/2010 | Gelerman |
| 2010/0063981 A1 | 3/2010 | Thomsen |
| 2010/0070323 A1 | 3/2010 | Polcari et al. |
| 2010/0070448 A1 | 3/2010 | Omoigui |
| 2010/0100424 A1 | 4/2010 | Buchanan et al. |
| 2010/0100427 A1 | 4/2010 | McKeown et al. |
| 2010/0100464 A1 | 4/2010 | Ellis et al. |
| 2010/0100469 A1 | 4/2010 | Buchanan et al. |
| 2010/0100470 A1 | 4/2010 | Buchanan et al. |
| 2010/0100561 A1 | 4/2010 | Cooper et al. |
| 2010/0106566 A1 | 4/2010 | Al-Otaibi et al. |
| 2010/0114672 A1 | 5/2010 | Klaus et al. |
| 2010/0125475 A1 | 5/2010 | Twyman |
| 2010/0131306 A1 | 5/2010 | Koo |
| 2010/0145861 A1 | 6/2010 | Law et al. |
| 2010/0145876 A1 | 6/2010 | Pessin |
| 2010/0153211 A1 | 6/2010 | Ramer et al. |
| 2010/0179916 A1 | 7/2010 | Johns et al. |
| 2010/0180029 A1 | 7/2010 | Fourman |
| 2010/0198863 A1 | 8/2010 | Lee et al. |
| 2010/0217652 A1 | 8/2010 | Brooks |
| 2010/0235299 A1 | 9/2010 | Considine |
| 2010/0287086 A1 | 11/2010 | Harris et al. |
| 2010/0299277 A1 | 11/2010 | Emelo et al. |
| 2010/0306017 A1 | 12/2010 | Dreyfuss et al. |
| 2010/0312713 A1 | 12/2010 | Keltner |
| 2010/0312718 A1 | 12/2010 | Rosenthal et al. |
| 2010/0332379 A1 | 12/2010 | Ram et al. |
| 2011/0173118 A1 | 7/2011 | Hu |
| 2011/0276494 A1 | 11/2011 | Hutchison et al. |
| 2011/0282803 A1 | 11/2011 | Woods et al. |

OTHER PUBLICATIONS

U.S. Appl. No. 12/152,074, filed May 12, 2008.
U.S. Appl. No. 12/172,541, filed Jul. 14, 2008.
U.S. Appl. No. 12/479,378, filed Jun. 5, 2009.
Ronald Lipman, "Adding family to credit card not always wise," *Houston Chronicle,* dated Jan. 18, 2008, printed from chron.com, 2 pages.
Lawrence Kutner, "Parent & Child," *The New York Times,* dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money In Public View," *The Wall Street Journal,* dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=Home Page, Internet site, accessed on Apr. 11, 2008, 1 page.
"Use Buxfer's analytics to *understand* your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.

(56) References Cited

OTHER PUBLICATIONS

"Transfer money online with Amazon Payments," printed from http://www.buxfer.com/tourphp?id=Send money, Internet site, accessed on Apr. 11, 2008, 1 page.

"Setup budgets to control your expenses," printed from http://www.buxfer.com/tour.php?id=Budgets, Internet site, accessed on Apr. 11, 2008, 1 page.

"Access Buxfer while on the move!" printed from http://www.buxfer.com/tour.php?id=Mobile, Internet site, accessed on Apr. 11, 2008, 1 page.

"Take Buxfer with you on the Internet everywhere!" printed from http://www.buxfer.com/tour.php?id=Gadgets, Internet site, accessed on Apr. 11, 2008, 1 page.

"Amazon Payments Account Management," printed from https://payments.amazon.com/sdui/sdui/paymentabout?about=true, Internet site, accessed on Apr. 11, 2008, 1 page.

"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.

"Billshare—a simple app for people who share bills," printed from http://billshare.org/, Internet site, accessed on Sep. 18, 2007, 2 pages.

"Get More from Your PayPal Account," printed from https://www.paypal.com/us/cgi-bin/webscr?cmd=xpt/cps/general/AccountOverview-outside, Internet site, accessed on Sep. 18, 2007, 2 pages.

"How PayPay Works—PayPal," printed from https://www.paypal.com/us/cgi-bin/webscr?cmd=xpt/cps/general/NewConsumerWorks-outside, Internet site, accessed on Sep. 18, 2007, 3 pages.

"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.

"Track Your Online Spending," printed from https://www.paypal.com/us/cgi-bin/webscr?cmd=xpt/cps/general/TrackingMoney-outside, Internet site, accessed on Sep. 18, 2007, 2 pages.

"Enter Details—PayPal," printed from https://www.paypal.com/us/cgi-bin/webscr?cmd=_flow&SESSION=6paX9BKc4FK4EJ8, Internet site, accessed on Sep. 18, 2007, 1 page.

"Review Payment Details—PayPal," printed from https://www.paypal.com/us/cgi-bin/webscr?cmd=_flow&SESSION=RMXX7KRmlnYnF, Internet site, accessed on Sep. 18, 2007, 1 page.

"Savings Plan," printed from http://quicken.intuit.com/images/screenshots/ss_savings_plan_lrg.gif, Internet site, accessed on Mar. 19, 2008, 1 page.

"Quicken Deluxe 2008," printed from http://quicken.intuit.com/personal-finance/deluxe-money-management.jhtml, Internet site, accessed on Mar. 19, 2008, 7 pages.

"SMS Banking," brochure by Acette Technologies FZ LLC, dated 2007, 3 pages.

Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.

Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.

Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.

John R. Quain, "Cellphone Banking Is Coming of Age," dated May 24, 2007, printed from http://www.nytimes.com/2007/05/24/technology/24basics.html?r=1&oref=slogin, Internet site, accessed on Oct. 12, 2007, 4 pages.

"Ducont—Mobile Payments," printed from http://www.ducont.com/Products/bnf_mdhm.htm, Internet site, accessed on Oct. 11, 2007, 1 page.

"Ducont—Bank.companion," printed from http://www.ducont.com/Products/bnf_bankcomp.htm, Internet site, accessed on Oct. 11, 2007, 1 page.

"MyCheckFree.com," printed from https://mycheckfree.com/br/wps?sp=10001&rq=bfbl, Internet site, accessed on Sep. 14, 2007, 1 page.

"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.

"MyCheckFree—Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 pages.

"Paytrust : Paying Bills Has Never Been Easier," printed from http://www.paytrust.com/learnmore.shtml, Internet site, accessed on Sep. 14, 2007, 2 pages.

"Why Use Paytrust® Instead of a Traditional Bill-Pay Service?" printed from http://www.paytrust.com/morethanbillpay.shtml, Internet site, accessed on Sep. 14, 2007, 3 pages.

"Paytrust: Frequently Asked Questions," printed from http://www.paytrust.com/commonquestions.shtml, Internet site, accessed on Sep. 14, 2007, 5 pages.

Richard Irons, "What is Envelope Budgeting—Why the Envelope Budgeting System is so Effective?" printed from http://www.mvelopes.com/articles/envelope-budgetinq.php, Internet site, 2 pages.

"Pocket Quicken," printed from http://www.landware.com/pocketquicken, Internet site, accessed on Sep. 14, 2007, 2 pages.

"Mobile Quicken™—Stand Alone or Connect with a Click," printed from http://www.landware.com/pocketquicken/moreinfo.html, Internet site, accessed on Sep. 14, 2007, 4 pages.

"UnitedOne Credit Union," printed from http://www.unitedone.org/ASP/home.asp, Internet site, accessed on Sep. 14, 2007, 3 pages.

"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.

"Quicken Starter Edition 2008," printed from http://quicken.intuit.com/personal-finance/starter-edition-personal-budget.jhtml, Internet site, accessed on Sep. 14, 2007, 5 pages.

"Jul. 2007 calendar," printed from http://quicken.intuit.com/images/screenshots/ss_calendar_lrg.gif, Internet site, accessed on Sep. 14, 2007, 1 page.

"Navigator," dated Jul. 2006, printed from www.pscu.org, Internet site accessed on Oct. 17, 2007, 2 pages.

"Bank of America Privacy Assist Premier™—Protect your credit and identity," printed from http://www.bankofamerica.com/pap/index.cfm?template=pap_assist_premier, Internet site, accessed on Oct. 17, 2007, 2 pages.

"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.

"Bank of America—Online Bill Pay and e-Bills Frequently Asked Questions," printed from http://www.bankofamerica.com/onlinebanking/index.cfm?template=faq_billpay, Internet site, accessed on Oct. 17, 207, 2 pages.

"Technology Credit Union," printed from http://www.techcu.com/resources/about_tech_cu/privacy/online.htm, Internet site, accessed on Oct. 17, 2007, 1 page.

"Billshare.org—Make Bill Paying with Roomies Easy—KillerStartups.com," printed from http://www.killerstartups.com/Web20/billshare--Make-Bill-Paying-with-Roomies-Easy/, Internet site, accessed on Sep. 18, 2007, 4 pages.

Every Penny Counts, Inc., Patent Property Due Diligence Chart, prepared Aug. 30, 2007, 8 pages.

Office Action dated Apr. 29, 2009 for U.S. Appl. No. 12/172,541, filed Jul. 14, 2008.

(56) References Cited

OTHER PUBLICATIONS

Office Action dated Apr. 2, 2009 for U.S. Appl. No. 12/152,028, filed May 12, 2008.
Office Action dated Sep. 16, 2009 for U.S. Appl. No. 12/152,028, filed May 12, 2008.
U.S. Appl. No. 12/689,375, filed Jan. 19, 2010.
U.S. Appl. No. 12/689,380, filed Jan. 19, 2010.
U.S. Appl. No. 12/696,959, filed Jan. 29, 2010.
U.S. Appl. No. 12/696,968, filed Jan. 29, 2010.
U.S. Appl. No. 12/696,647, filed Jan. 29, 2010.
David A. Moss, Gibbs A. Johnson, "The rise of consumer bankruptcy: Evolution, revolution, or both?" *American Bankruptcy Law Journal*, v. 73, n. 2, pp. 311-351, Spring 1999, printed from http://dialogquicksearch.dialog.com/USPTO/search/getDocument.action?r=5cb38c39-dcc8, Internet site, accessed on Sep. 26, 2010, 25 pages.
Office Action dated Sep. 28, 2010 for U.S. Appl. No. 12/152,073, filed May 12, 2008.
Office Action dated Jun. 15, 2010 for U.S. Appl. No. 12/152,028, filed May 12, 2008.
Office Action dated Oct. 1, 2010 for U.S. Appl. No. 12/152,074, filed May 12, 2008.
Office Action dated Jan. 19, 2010 for U.S. Appl. No. 12/172,541, filed Jul. 14, 2008.
U.S. Appl. No. 12/803,707, filed Jul. 2, 2010.
U.S. Appl. No. 12/803,706, filed Jul. 2, 2010.
U.S. Appl. No. 12/754,967, filed Jul. 2, 2010.
U.S. Appl. No. 12/754,974, filed Apr. 6, 2010.
U.S. Appl. No. 12/803,705, filed Jul. 2, 2010.
U.S. Appl. No. 12/803,684, filed Jul. 2, 2010.
U.S. Appl. No. 13/324,534, filed Dec. 13, 2011.
U.S. Appl. No. 13/324,575, filed Dec. 13, 2011.
U.S. Appl. No. 13/324,596, filed Dec. 13, 2011.
U.S. Appl. No. 13/355,056, filed Jan. 20, 2012.
Phillip Robinson, "Mastering Your Money," *San Jose Mercury News*, Oct. 9, 1997, 3 pages.
Tom Rawstorne, "What's your child buying online?; Alcohol, knives, pornography . . . All bought over the internet by a 14-year-old boy using a debit card. So why are the banks giving them to children without telling their parents?" *Daily Mail*, London, Jul. 10, 2008, p. 50, retrieved Jun. 30, 2011, 5 pages.
CNNMoney.com, "What are you worth?" printed from http://web.archive.org/web/20021008185050/http://cgi.money.cnn.com/tools/networth/networth.html, Internet site, accessed on Jul. 13, 2011, 2 pages.
"How can I automatically generate an index in Word?," printed from http://word.mvps.org/faqs/formatting/CreateIndexContent.htm, Internet site, accessed on Feb. 17, 2011, 4 pages.
"PeopleSoft Enterprise Human Capital Management—Employee Benefits and Compensation Modules," printed from http://www.2020software.com/products/PeopleSoft_Enterprise_Human_Capital_Management_Employee_Benefits_and_Compensation_Modules.asp, Internet site, accessed on Jul. 17, 2011, 7 pages.
"Free Online Employee Attendance Tracking Software," printed from http://www.tracksmart.com, Internet site, accessed on Jul. 17, 2011, 2 pages.
"Compensation Software Solutions for Small Business I Taleo," printed from http://www.taleo.com/solutions/taleo-business-edition-comp?_kk=HR%, Internet site, accessed on Jul. 17, 2011, 1 page.
"Tracking training has never been so easy." printed from http://www.conductit.com/, Internet site, accessed on Jul. 17, 2011, 2 pages.
"Track Employee Training Easily with Conductor® Employee Education Training Tracking Software," printed from http://www.conductit.com/product.asp, Internet site, accessed on Jul. 17, 2011, 2 pages.
"HSBC Employee Career Track Information," printed from http://www.hsbcusa.com/careers/hsbc_employees/impacted_employees_information.html, Internet site, accessed on Jul. 17, 2011, 2 pages.
"Conductor® at a glance Take the Quick Tour!" printed from http://www.conductit.com/tourasp#1, Internet site, accessed on Jul. 17, 2011, 11 pages.
"Replicon—Time Tracking made Easy with Web TimeSheet," printed from http://www.replicon.com/Ip/Ip_ta_vacation_tracking.aspx?, Internet site, accessed on Jul. 17, 2011, 2 pages.
Notice of Allowance dated May 3, 2011 for U.S. Appl. No. 12/152,073, filed May 12, 2008.
Office Action dated Jul. 8, 2011 for U.S. Appl. No. 12/366,711, filed Feb. 6, 2009.
Office Action dated Aug. 4, 2011 for U.S. Appl. No. 12/479,378, filed Jun. 5, 2009.
Office Action dated Jan. 3, 2012 for U.S. Appl. No. 12/696,968, filed Jan. 29, 2010.
Office Action dated Jan. 3, 2012 for U.S. Appl. No. 12/696,959, filed Jan. 29, 2010.
Office Action dated Mar. 21, 2012 for U.S. Appl. No. 12/366,711, filed Feb. 6, 2009.
Office Action dated Mar. 15, 2012 for U.S. Appl. No. 12/479,378, filed Jun. 5, 2009.
Office Action dated Feb. 1, 2012 for U.S. Appl. No. 12/696,647, filed Jan. 29, 2010.
Office Action dated Apr. 18, 2012 for U.S. Appl. No. 13/037,063, filed Feb. 28, 2011.
Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.

\* cited by examiner

FINANCIAL EMAIL

TECHNICAL FIELD OF THE INVENTION

This application is directed generally and in various embodiments to a system for providing a network-based banking user interface having an integrated email service.

BACKGROUND

Banks and other financial institutions (hereinafter "institutions") frequently offer network-based product and service features to their customers as an alternative to those provided via traditional "brick and mortar" banking channels. These features are usually provided by way of a user interface (UI) of a secure Web site hosted by the institution and remotely accessible to its customers using client devices, such as, for example, personal computers (PCs) or other network-enabled devices. Examples of such features include account balance inquiries, electronic funds transfers, transaction information downloads, bill presentment and payment, loan applications, and investment services. Because the UI is typically available to client devices over the Internet, the terms "Internet banking" or "online banking" are commonly used to refer to the availability and use of such features. From a customer standpoint, advantages of Internet banking include the ability to interact with their banking institution any time from virtually any location, the convenience of managing their finances from a single source, and increased transactional speed. Internet banking additionally provides significant economic benefits to banking institutions in terms of reduced paper handling and reduced teller interactions.

Internet banking customers invariably need to communicate with other parties regarding aspects of their finances. Such parties may include, for example, the host institution or other institution(s), billing parties (e.g., utility companies, credit card companies, etc.), and other parties having a financial relationship with the customer (e.g., a roommate, a business partner, a financial advisor, etc.). Such communication is often conducted by email contemporaneously with the customer's Internet banking session using the same client device. Although currently available Internet banking UIs sometimes offer secure messaging services, communication is typically limited to exchanges between the customer and employees of the host institution. In order to exchange email communications with parties other than the financial institution, the customer is thus required to use an email service separate from the Internet banking UI. The use of a separate email service for exchanging financial communications poses certain disadvantages, however. In particular, the need to invoke an additional application may be inconvenient and generally lessens the efficiency afforded by an otherwise self-contained UI. Additionally, because email relating to the customer's finances is interspersed with other unrelated and potentially distracting communications, the customer's ability to focus on Internet banking tasks at hand is diminished, and the risk of overlooking or inadvertently deleting a financial communications is increased.

SUMMARY

In one general respect, the present application is directed to a user interface hosted by a financial institution. The user interface is accessible via a communication network by a first user using a client device and includes at least one first screen for managing financial transactions of the first user. The user interface further includes a second screen for conducting email communication between the first user and at least one party other than the financial institution.

In another general respect, the present application is directed to a system including a network-enabled client device associated with a first user of a financial institution and including a display, and a user interface hosted by the financial institution. The user interface is accessible via a communication network using the client device and includes at least one first screen for managing financial transactions of the first user and a second screen for conducting email communication between the first user and at least one party other than the financial institution.

DESCRIPTION

Figure 1:
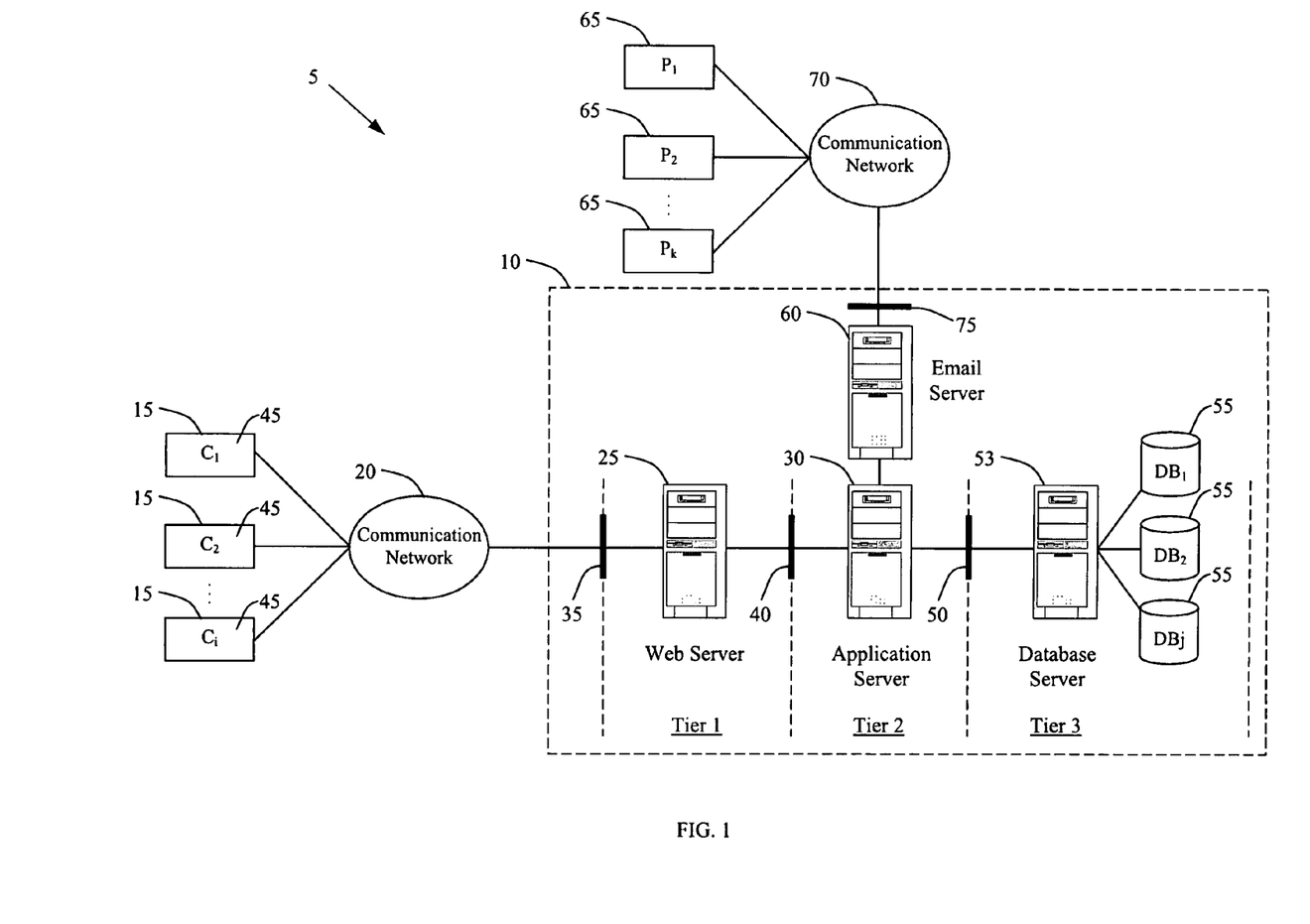
FIG. 1 illustrates a system according to various embodiments.

FIG. 1 illustrates a system 5 according to various embodiments for providing a network-based banking UI having an integrated email service. As will be appreciated from the description that follows, the ability to access email service from within a network-based banking UI provides a significant advantage over current banking UIs that typically limit users to communications exchanges with the host institution. One undesirable consequence of this limitation, as explained above, is the need for a separate email application. The UI provided by the system 5, by contrast, enables users to communicate with not only the host institution, but also other parties regarding aspects of their finances, thereby eliminating inconveniences that would otherwise arise from the use of a separate email application. Moreover, because the UI provided by the system 5 enables management of financial communications separately from nonfinancial communications, the user is better able to focus on banking tasks at hand, and the risk of overlooking or deleting financial communications that would otherwise be interspersed with nonfinancial email is reduced.

As shown, the system 5 may include a host system 10 in communication with one or more client devices $C_1, C_2, \ldots C_i$ 15 (hereinafter "clients 15") via a communication network 20. The host system 10 may be implemented by a bank or other financial institution (hereinafter "host institution") and configured to provide network-based product and service features to users (e.g., customers of the host institution) associated with the clients 15. In certain embodiments, the communication network 20 may be implemented using the Internet, although it will be understood that any public or private communication network suitable for enabling the electronic exchange of information between the host system 10 and the clients 15 using wireline and/or wireless communication channels may generally be used.

In certain embodiments, the host system 10 is based on a tiered network architecture and includes a Web server 25, an application server 30, and a database server 35. The Web server 25 corresponds to a first tier of the host system 10 and communicates with the communication network 20 and the application server 30 via a border firewall 35 and an application firewall 40, respectively. The Web server 25 may be configured to accept information requests (e.g., HTTP requests) from one or more of the clients 15 (e.g., PCs and/or other network-enabled devices associated with the users) via the communication network 20 and provide suitable responses thereto. The responses may include, for example, HTTP responses including static and/or dynamic HTML documents for providing an Internet banking user interface (UI) 45 to users via the clients 15. The Web server 25 may further be configured to authenticate each user's credentials before allowing access to the UI 45 and other resources associated with the host system 10. Authentication may be performed, for example, using a user name and a password.

The application server 30 corresponds to a second tier of the host system 10 and communicates with the Web server 25 and the data base server 35 via the application firewall 40 and an internal firewall 50, respectively. The application server 30 may host one or more applications executing logic to provide banking product and service features to each user via a corresponding UI 45. The application server 30 may receive user-entered information from the UI 45 of each client 15 via the Web server 25. Such information may include, for example, a user name and password associated with the user and a request to access particular banking features. Based on this and other information received from the clients 15, applications hosted by the application server 30 may perform financial transactions (e.g., transfer funds between accounts, retrieve account balances, etc.) and generate corresponding informational content (e.g., transfer confirmations, account balance information, etc.). Information regarding such transactions may be communicated to the Web server 25 and subsequently presented to the users using, for example, a dynamic Web page of the UI 45. As discussed in further detail below, the application server 30 may also host an application for enabling users to conduct email communication with the host institution and other parties.

The database server 53 corresponds to a third tier of the host system 10 and communicates with the application server 30 via the internal firewall 50. The database server 53 may manage one or more databases $DB_1, DB_2, \ldots DB_j$ 55 (hereinafter "databases 55") storing data to support one or more applications hosted by the application server 30 or elsewhere. Such databases may include, for example, account information databases, user information databases, user preferences/settings databases, as well as databases for storing other settings and/or configuration data. Database information requested by a particular application may be retrieved from the databases 55 by the database server 53, communicated to the requesting application, and updated by the database server 53 as needed.

The clients 15, as discussed above, may be PCs and/or other network-enabled devices (e.g., cell phones, PDAs, etc.) configured to transmit and receive information via the communication network 20 using a wired or wireless connection. The clients 15 may include a suitable browser software application (e.g., Internet Explorer, Internet Explorer Mobile, Firefox, Blazer, etc.) for enabling the user to display and interact with information exchanged via the communication network 20. The clients 15 may thus access and navigate static and/or dynamic HTML documents of the UI 45.

The host system 10 may further include an email server 60 in communication with the application server 30. The email server 60 may include an email client application for enabling the exchange of electronic communications between clients 15 and one or more parties $P_1, P_2, \ldots P_k$ 65 (hereinafter "parties 65") external to the host system 10. Generally, each party 65 may be any person or entity with whom a user desires to communicate regarding particular aspects of his finances, or financial matters generally. As discussed above, such parties may include, for example, billing parties (e.g., utility companies, credit card companies, etc.), and other parties having an existing financial relationship with the user (e.g., a roommate, a business partner, a financial advisor, etc.). The parties 65 may further include parties with whom the user 15 does not have, but desires to establish, a financial relationship. Electronic communications may be exchanged between the email server 60 and the parties 65 via a communication network 70. Although the communication network 70 is depicted separately from the communication network 20 in FIG. 1, it will be appreciated that the communication networks 20, 70 may be a common communication network (e.g., the Internet). The host name of the email server 60 may be determined by a registered domain name of the host institution (e.g., abcbank.com).

In certain embodiments and as shown, the host system 10 may include an email firewall 75 disposed between the email server 60 and the communication network 70. To supplement network traffic protection provided by the email firewall 75, the email server 60 may implement one or more policies for intercepting email (e.g., "spam" email) unrelated to financial matters. In certain embodiments, the email server 60 may support customization of spam policies by, for example, allowing a user to view intercepted email and authorize trusted senders. Additionally, the email server 60 may implement virus-scanning software for preventing attacks on servers of the host system 10 by identifying and stripping malicious email content.

Figure 2:
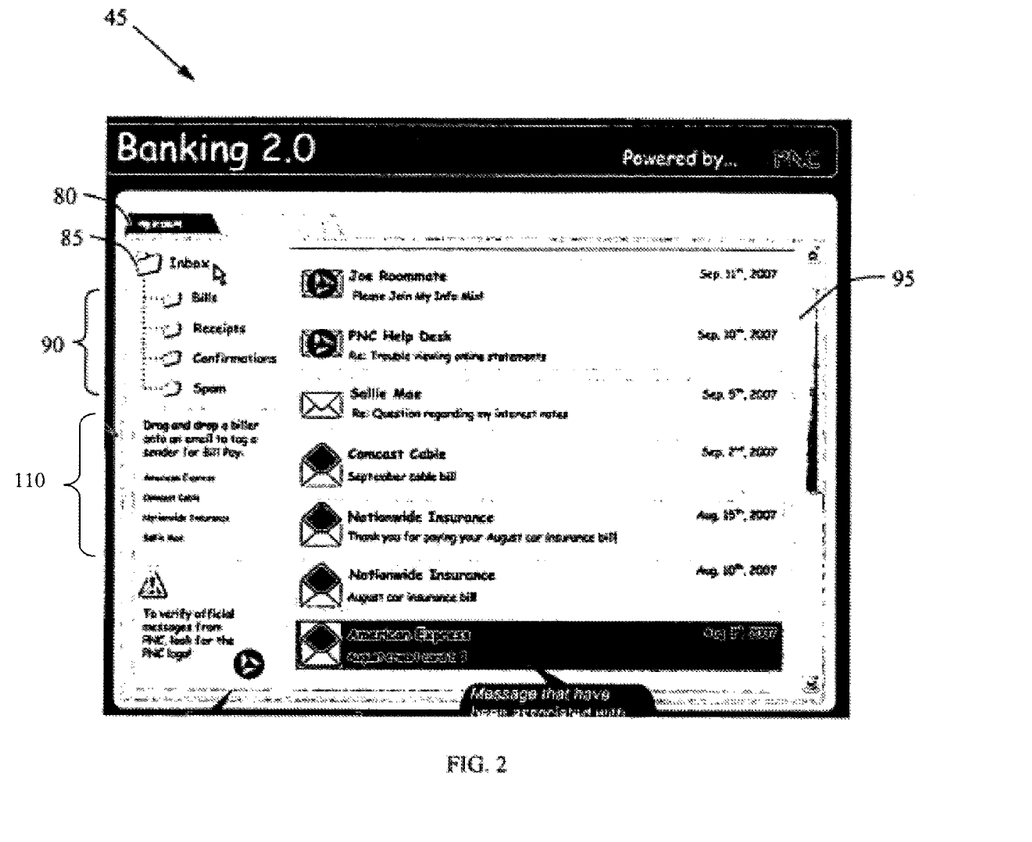
FIG. 2 illustrates a user interface according to various embodiments.

FIG. 2 illustrates a UI 45 provided by the host system 10 via a client 15 according to various embodiments. The UI 45 may be implemented, for example, as dynamic and/or static HTML Web pages hosted by the Web server 25 and accessible to the client 15 subsequent to user authentication. The UI 45 may include a screen 80 for providing email services in conjunction with an email address issued to the user by the host institution (e.g., johnsmith@abcbank.com) and subsequently communicated by the user to the parties 65 or others with whom communication regarding financial matters is desired. Other UI 45 screens accessible from screen 80 may include, for example, financial calendar screens, account detail screens, bill scheduling and payments screens, and alert screens.

According to various embodiments, the screen 80 may include features similar to those of conventional graphical email interfaces. Such features may include, for example, an inbox folder 85 for storing newly received email and a user-definable hierarchy of subfolders 90 into which email from the inbox folder 85 may be selectively placed using a mouse or other pointing device associated with the client 15. The screen 80 may also include a scrollable display panel 95 listing email stored in a particular folder subsequent to selection of the folder by the user. Other features included on the screen 80 may include, for example, user-definable rules for automatically filing newly-received email into a specified subfolder, a search tool for searching received and/or sent email (e.g., based on the sender's name and/or other email content), and an address book feature.

Content may be provided to the screen 80 in accordance with a Web-based email scheme. According to such embodiments, email sent to a user from one or more parties 65 (or from other Internet banking users or the host institution) may be stored in the email server 60 and selectively accessed by an email client application resident on the application server 30. For example, when the screen 80 is initially displayed by the user, the email client application of the application server 30 may access email associated with the inbox folder 85 for communication to the UI 45 using a suitable communication protocol, such as, for example, an Internet Message Access Protocol (IMAP). In response to the subsequent selection of a subfolder 90, the email client application of the application server 30 may similarly access and communicate the email associated with the selected subfolder 90. Email communicated to the UI 45 may be listed in the display panel 95 of the screen 80, with each listed email including summary information, such as, for example, the sender's name, a subject line, and a date and/or time of transmission. In certain embodiments, the summary information may further include an icon or similar indicia for identifying the sender generally. In cases where an email is sent by the host institution, for example, an icon in the form of the host institution's corporate logo may be included with the summary information. An identical or different icon may be provided to identify email sent from another client 15 of the host institution, and another icon may be used to identify email originating from the parties 65. In this way, a relative indication of email authenticity may be provided.

In addition to enabling the display and manipulation of received email, the screen 80 may include email composition features for generating and sending email. Email recipients may include one or more of the parties 65, users associated with other clients 15, and the host institution. In certain embodiments, the screen 80 may include document attachment features such that one or more files associated with applications resident on the client 15 (e.g., word processing documents, spreadsheet documents, etc.) or other files stored on the client 15 may be attached to and transmitted with an email. Email originating from the client 15 may be communicated to the email server 60 via the email client application of the application server 30. Depending on the specified recipient, sent email may be communicated to an email server (not shown) external to the host system 10 using any suitable communication protocol, such as, for example, a Simple Mail Transfer Protocol (SMTP). In cases where the specified recipient of sent email is a user associated with a client 15 or the host institution, sent email may be retained on the email server 60 for internal delivery. Sent email may be automatically placed into a sent email folder (not shown) accessible from the screen 80.

Figure 3:
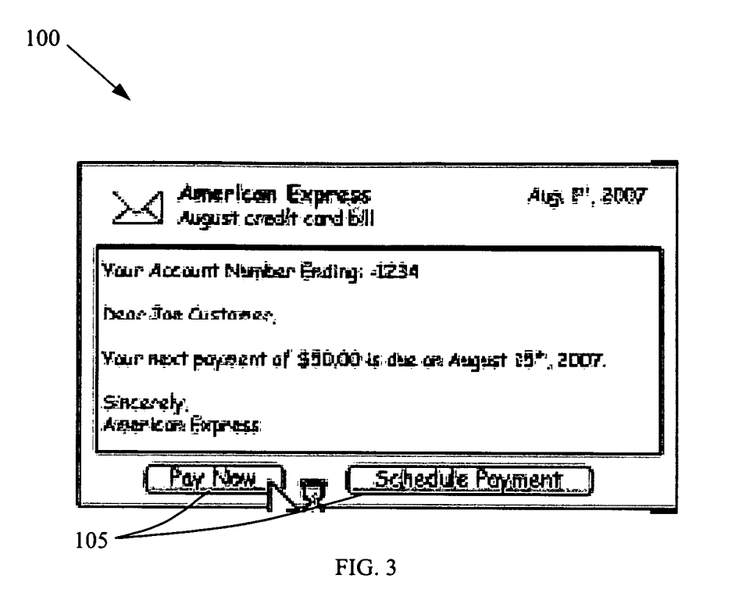
FIG. 3 illustrates an email displayable via a screen of the user interface according to various embodiments.

One advantage afforded by the screen 80 is the ability to receive bills or electronic statements by email from within the UI 45 and without the need for a separate email application. FIG. 3 illustrates an example of an email in the form of an electronic statement 100 received from a credit card company according to one embodiment. The email may be opened to display the statement 100, for example, by double-clicking on the email from the display panel 95. The statement 100 may indicate, for example, a name of the billing party, a payment amount due, and a date by which payment is expected. In certain embodiments, the statement 100 may include selectable buttons 105 providing the user with options to submit the payment amount at the present time or to schedule a future payment. Selection of either option may activate corresponding bill payment or payment scheduling functionalities associated with other screens of the UI 45.

Referring again to FIG. 2, the screen 80 may include tools for tagging or otherwise associating bill-related email (such as the statement 100 of FIG. 3) with particular billing parties. In one embodiment, for example, the screen 80 may include a biller list 110 containing tags representative of billing parties currently used by the user. A tag from the list 110 may be selectively associated with a corresponding email received from the billing party (e.g., by dragging and dropping the tag onto the corresponding email). In this way, senders of bill-related email may be tagged such that features of other screens of the UI 45 may be cross-utilized. For example, tagging a newly received email received from a billing party via screen 80 may automatically provide a calendar-based indication or other indication on one or more separate UI screens showing the payment amount, the due date, and the billing party's identity. Similarly, the status of transactions conducted using other UI screens (e.g., bill payment and scheduling activities) may be reflected on the screen 80 by virtue of the tag/email associations. For example, payment of a bill using a bill payment screen of the UI may be reflected on the screen 80 by suitably coloring email associated with the paid billing party. In a similar fashion, bills scheduled for payment and/or bills that have not been timely paid may be reflected on the screen 80 by suitably coloring email associated with the corresponding billing parties. In certain embodiments, for example, email associated with billing parties that have been timely paid may be colored green, email associated with billing parties having scheduled payments may be colored blue, and email associated with billing parties that will be paid late may be colored red.

Although embodiments described above may access the UI screen 45 via a network-enabled client 15, it will be appreciated that the UI screen 45 may be accessible using other devices and communication channels. In certain embodiments, for example, the screen 80 or features thereon may be accessible to users via an automated teller machine (ATM) in communication with the application server 30 via a communication network. In such embodiments, graphical and textual aspects of the screen 80 may be adapted to conform to the particular hardware and software requirements of the ATM.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and, therefore, a more detailed description of such elements is not provided herein.

Any element expressed herein as a means for performing a specified function is intended to encompass any way of performing that function, including, for example, a combination of elements that performs that function. Furthermore, the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (nonvolatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further involve one or more data signals transmitted on one or more propagated computer-readable media.

Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A user interface having an integrated email service hosted by a financial institution, the user interface accessible via a communication network by a first user using a client device, the user interface comprising:
   at least one first screen within the user interface for managing financial transactions of the first user; and
   a second screen within the user interface for conducting email communication between the first user and at least one party other than the financial institution, wherein the second screen comprises:
      a first list comprising at least one email received from a billing party by the first user, wherein the at least one email comprises an identity of the billing party, and
      a second list comprising a tag that is representative of the billing party and selectively associable with the at least one email received from the billing party using a drag and drop operation;
      wherein selective association of the tag with the at least one email received from the billing party on the second screen causes an indication of a corresponding financial transaction between the first user and the billing party to be provided on the at least one first screen.

2. The user interface of claim 1, wherein the second screen is for conducting email communication between the first user and the financial institution.

3. The user interface of claim 1, wherein the email associated with the tag comprises indicia representative of a status of the financial transaction.

4. The user interface of claim 3, wherein the indicia comprises a green color to represent a completed transaction.

5. The user interface of claim 3, wherein the indicia comprises a blue color to represent a scheduled transaction.

6. The user interface of claim 3, wherein the indicia comprises a red color to represent a late transaction.

7. The user interface of claim 1, wherein each email contained in the first list includes graphical indicia identifying a sender.

8. The user interface of claim 1 comprising an email address issued to the first user by the financial institution.

9. The user interface of claim 1 wherein the at least one first screen is selected from the group consisting of a financial calendar screen, an account detail screen, a bill scheduling screen, a payment screen, and an alert screen.

10. The user interface of claim 1 wherein selectively associating the tag with the at least one email received from the billing party on the second screen automatically provides a calendar-based indication of the corresponding financial transaction between the first user and the billing party on a financial calendar screen.

11. The user interface of claim 1 wherein selectively associating the tag with the at least one email received from the billing party on the second screen automatically provides a bill payment indication of the corresponding financial transaction between the first user and the billing party on a bill payment screen.

12. The user interface of claim 1 wherein selectively associating the tag with the at least one email received from the billing party on the second screen automatically provides a bill scheduling indication of the corresponding financial transaction between the first user and the billing party on a bill scheduling screen.

13. The user interface of claim 1 wherein selectively associating the tag with the at least one email received from the billing party on the second screen automatically provides an indicia representative of a status of the financial transaction by coloring the email received from the billing party.

14. A system comprising:

a network-enabled client device associated with a first user of a financial institution, wherein the client device includes a display; and a user interface having an integrated email service hosted by a financial institution, the user interface accessible via a communication network using the client device, wherein the user interface comprises:

at least one first screen within the user interface for managing financial transactions of the first user; and a second screen within the user interface for conducting email communication between the first user and at least one party other than the financial institution; wherein the second screen comprises:

a first list comprising at least one email received from a billing party by the first user, wherein the email comprises an identity of the billing party, and a second list comprising a tag that is representative of the billing party and selectively associable with the at least one email received from the billing party using a drag and drop operation;

wherein selective association of the tag with the at least one email received from the billing party on the second screen causes an indication of a corresponding financial transaction between the first user and the billing party to be provided on the at least one first screen.

15. The system of claim 14, wherein the second screen is for conducting email communication between the first user and the financial institution.

16. The system of claim 14, wherein the email associated with the tag comprises indicia representative of a status of the financial transaction.

17. The system of claim 16, wherein the indicia comprises a green color to represent a completed transaction.

18. The system of claim 16, wherein the indicia comprises a blue color to represent a scheduled transaction.

19. The system of claim 16, wherein the indicia comprises a red color to represent a late transaction.

20. The system of claim 14, wherein each email contained in the first list includes graphical indicia identifying a sender.

* * * * *